United States Patent
Chapaton et al.

(10) Patent No.: US 11,198,349 B2
(45) Date of Patent: Dec. 14, 2021

(54) ANTIMICROBIAL TREATMENT FOR HVAC SYSTEMS

(71) Applicant: GM GLOBAL TECHNOLOGY OPERATIONS LLC, Detroit, MI (US)

(72) Inventors: Thomas J. Chapaton, Sterling Heights, MI (US); Mahmoud Abd Elhamid, Troy, MI (US); Michael J. Moore, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 183 days.

(21) Appl. No.: 16/398,770

(22) Filed: Apr. 30, 2019

(65) Prior Publication Data

US 2020/0346522 A1 Nov. 5, 2020

(51) Int. Cl.
*B60H 1/32* (2006.01)
*B60H 3/02* (2006.01)
*F28F 19/06* (2006.01)

(52) U.S. Cl.
CPC ........... *B60H 1/3227* (2013.01); *B60H 3/024* (2013.01); *F28F 19/06* (2013.01)

(58) Field of Classification Search
CPC .... B60H 1/3227; B60H 3/024; B60H 3/0085; B60H 3/0021; F28F 19/06; F28F 19/02; F28F 2265/20; A61L 2209/16; C02F 2201/3228; C09D 5/14
See application file for complete search history.

(56) References Cited

U.S. PATENT DOCUMENTS

| | | | |
|---|---|---|---|
| 4,422,824 A | 12/1983 | Eisenhardt, Jr. | |
| 5,014,774 A | 5/1991 | Siak et al. | |
| 5,042,575 A * | 8/1991 | Lindsay | F24F 13/00 165/134.1 |
| 5,330,722 A | 7/1994 | Pick et al. | |
| 5,366,004 A * | 11/1994 | Garner | B60H 1/00507 165/133 |
| 5,553,459 A | 9/1996 | Harrison | |
| 8,388,731 B2 | 3/2013 | Metteer | |

(Continued)

FOREIGN PATENT DOCUMENTS

| | | |
|---|---|---|
| CN | 2473565 Y | 1/2002 |
| CN | 201935110 U | 8/2011 |

(Continued)

*Primary Examiner* — Frantz F Jules
*Assistant Examiner* — Martha Tadesse
(74) *Attorney, Agent, or Firm* — Quinn IP Law

(57) ABSTRACT

A heating, ventilation, and air conditioning (HVAC) system may comprise an evaporator core including an upstream inlet face in which humid air is received, a downstream outlet face from which dehumidified air is discharged, and a plurality of air-contacting surfaces extending between the inlet and outlet faces. In one form, an antimicrobial coating may be formed on the air-contacting surfaces of the evaporator core. The antimicrobial coating may comprise an ionic material having immobilized ionic groups of one type of charge and mobile counterions of another type of charge. The mobile counterions may be ionically associated with the immobilized ionic groups. In another form, an ultraviolet light emitting diode (UV-LED) may be used to direct UV light onto the air-contacting surfaces of the evaporator core.

17 Claims, 2 Drawing Sheets

(56) References Cited

U.S. PATENT DOCUMENTS

| | | | |
|---|---|---|---|
| 9,960,323 B2 | 5/2018 | Chen et al. | |
| 10,143,770 B2 | 12/2018 | Kim et al. | |
| 2002/0068093 A1* | 6/2002 | Trogolo | A61L 29/085 424/618 |
| 2007/0227362 A1 | 10/2007 | Parker | |
| 2009/0242656 A1* | 10/2009 | Peard | B60H 3/0092 239/8 |
| 2011/0182951 A1* | 7/2011 | Burger | A01N 59/20 424/400 |
| 2013/0150809 A1* | 6/2013 | Whiteford | A61L 31/08 604/265 |
| 2014/0321123 A1 | 10/2014 | Li et al. | |
| 2017/0100989 A1 | 4/2017 | Chapaton et al. | |
| 2018/0340046 A1* | 11/2018 | Hopkins | C11D 1/22 |
| 2019/0076558 A1 | 3/2019 | Zhang-Miske et al. | |

FOREIGN PATENT DOCUMENTS

| | | |
|---|---|---|
| CN | 102627906 A | 8/2012 |
| CN | 202736977 U | 2/2013 |
| CN | 104449207 A | 3/2015 |
| CN | 106752684 A | 5/2017 |
| CN | 107115721 A | 9/2017 |
| CN | 107216720 A | 9/2017 |
| KR | 20160000998 U | 3/2016 |

\* cited by examiner

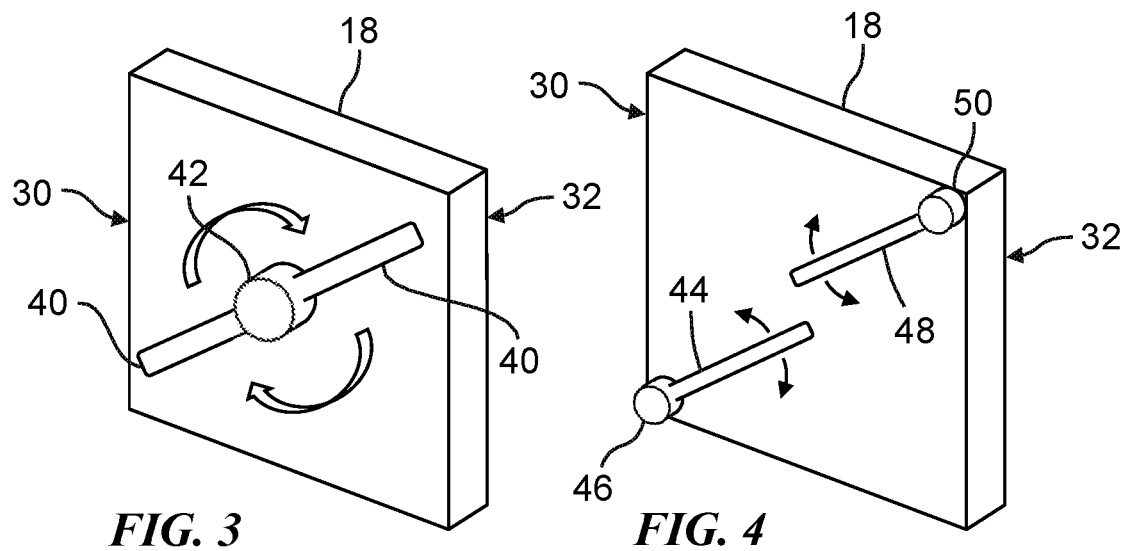
FIG. 3
FIG. 4
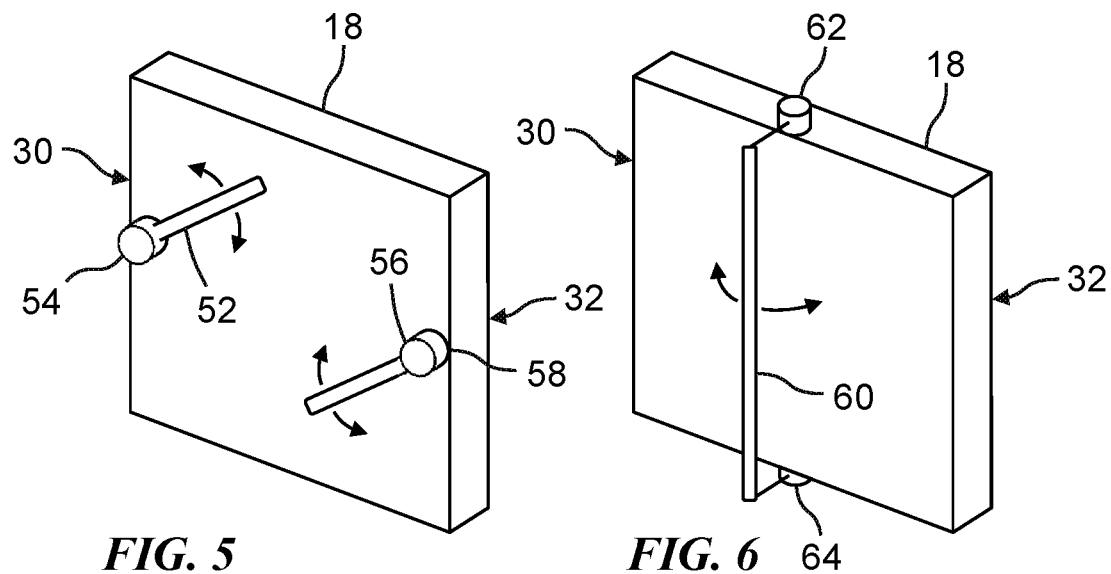
FIG. 5
FIG. 6

US 11,198,349 B2

ANTIMICROBIAL TREATMENT FOR HVAC SYSTEMS

INTRODUCTION

Heating, ventilation, and air conditioning (HVAC) systems are oftentimes used to provide a controlled environment within a passenger compartment of an automotive vehicle. Such HVAC systems oftentimes include an evaporator core, a heater core downstream of the evaporator core, and a blower that generates air flow through the HVAC system and into the passenger compartment of the vehicle. Air introduced into the HVAC system may comprise ambient air received from outside the vehicle or recirculated air returning from the passenger compartment of the vehicle.

During air conditioning operation, air is directed through the evaporator core and in contact with the air-contacting surfaces of the evaporator core to cool and dehumidify the air prior to introducing the air into the passenger compartment. When the relatively warm, humid air contacts the relatively cool air-contacting surfaces of the evaporator core, excess humidity in the air tends to condense and collect as water droplets on the air-contacting surfaces of the evaporator core. These water droplets eventually drip from the evaporator core (e.g., by gravity) into a drip pan located below the evaporator core and may accumulate in the drip pan until being drained from the HVAC system and discharged from the vehicle. In some instances, the water droplets on the air-contacting surfaces of the evaporator core and the water collected in the drip pan of the HVAC system may promote the growth of microorganisms within the HVAC system. And, as a byproduct of this microbial growth and metabolism, an undesirable odor may be imparted to the air passing through the HVAC system and subsequently introduced into the passenger compartment of the vehicle.

SUMMARY

A heating, ventilation, and air conditioning (HVAC) system may comprise an air intake in which air is received, an air outlet from which air is discharged, and an evaporator core disposed in fluid communication with the air intake and the air outlet. The evaporator core may include an upstream inlet face in which humid air is received, a downstream outlet face from which dehumidified air is discharged, and a plurality of air-contacting surfaces extending between the inlet and outlet faces. An antimicrobial coating may be formed on the air-contacting surfaces of the evaporator core. The antimicrobial coating may comprise an ionic material having immobilized ionic groups of one type of charge and mobile counterions of another type of charge. The mobile counterions may be ionically associated with the immobilized ionic groups.

In one form, the ionic material may comprise an anionic material. In such case, the mobile counterions may comprise cations of at least one of silver, copper, zinc, or vanadium. Additionally or alternatively, the mobile counterions may comprise quaternary ammonium cations or quaternary phosphonium cations.

In another form, the ionic material may comprise a cationic material. In such case, the immobilized ionic groups may comprise quaternary ammonium groups or quaternary phosphonium groups.

In one form, the ionic material may comprise a zeolite.

In another form, the ionic material may comprise an organic polymer having a covalently bound ionic group. In such case, the organic polymer may comprise at least one of a polyolefin, polyester, polyurethane, polystyrene, polyacrylate, polymethacrylate, poly(methyl methacrylate), polyacrylonitrile, polybutadiene, polyisoprene, poly(vinyl acetate), acrylonitrile-butadiene-styrene (ABS) copolymer, styrene-acrylonitrile (SAN) copolymer, or styrene-ethylene-butylene-styrene copolymer. The covalently bound ionic group may comprise at least one of a carboxylate, sulfonate, phosphonate, quaternary ammonium, or quaternary phosphonium group. In some specific embodiments, the ionic material may comprise sulfonated polystyrene, sulfonated tetrafluoroethylene, ethylene acrylic acid copolymer (EAA), or ethylene (meth)acrylic acid copolymer (EMAA).

The ionic material may comprise an ionomer.

The mobile counterions may constitute less than 50 wt. % of the ionic material.

The antimicrobial coating may comprise particles of the ionic material dispersed in a polymeric binder.

The air-contacting surfaces of the evaporator core may be defined by an array of metal plates or fins.

The evaporator core may comprise a tube and fin, plate and fin, or plate and frame heat exchanger.

The air outlet may be in fluid communication with a passenger compartment of an automotive vehicle.

A heating, ventilation, and air conditioning (HVAC) system for an automotive vehicle may comprise a housing and an evaporator core supported within the housing. The housing may include an air intake in which air is received and an air outlet from which air is discharged. The evaporator core may be disposed in fluid communication with the air intake and the air outlet of the housing and may include an upstream inlet face in which humid air is received, a downstream outlet face from which dehumidified air is discharged, and a plurality of air-contacting surfaces extending between the inlet and outlet faces. An antimicrobial coating may be formed on the air-contacting surfaces of the evaporator core. The antimicrobial coating may comprise an ionic material having immobilized ionic groups of one type of charge and mobile counterions of another type of charge. The mobile counterions may be ionically associated with the immobilized ionic groups.

The ionic material may comprise an ionomer or a zeolite material.

In one form, the ionic material may comprise an anionic material. In such case, the mobile counterions may comprise cations of at least one of silver, copper, zinc, vanadium, quaternary ammonium, or quaternary phosphonium.

In another form, the ionic material may comprise a cationic material. In such case, the immobilized ionic groups may comprise quaternary ammonium groups or quaternary phosphonium groups.

The air-contacting surfaces of the evaporator core may be defined by an array of metal plates or fins. In such case, the metal plates or fins may comprise an aluminum (Al) alloy.

BRIEF DESCRIPTION OF THE DRAWINGS

Illustrative embodiments will hereinafter be described in conjunction with the appended drawings, wherein like designations denote like elements, and wherein:

FIG. 3 is a schematic perspective view of an evaporator core having a rotating UV-LED positioned adjacent an inlet face of the evaporator core;

FIG. 4 is a schematic perspective view of an evaporator core having a pair of UV-LEDs positioned adjacent an inlet face of the evaporator core, wherein the pair of UV-LEDs are respectively disposed on opposite first and second corners of the evaporator core;

FIG. 5 is a schematic perspective view of an evaporator core having a pair of UV-LEDs positioned adjacent an inlet face of the evaporator core, wherein the pair of UV-LEDs are respectively disposed on opposite first and second sides of the evaporator core; and FIG. 6 is a schematic perspective view of an evaporator core having a UV-LED suspended adjacent an inlet face of the evaporator core by a pair of first and second hubs.

DETAILED DESCRIPTION

The presently disclosed HVAC systems can be used to prevent, inactivate, or inhibit growth of microorganisms within the HVAC system and thereby prevent or reduce the generation of odors associated with microorganism growth and/or metabolism. The term "microorganisms" refers to bacteria, viruses, parasites (including protozoans and helminths), and fungi (including mold and mildew). The term "antimicrobial" refers to a composition or an agent that kills, inactivates, or inhibits the growth and/or metabolism of such microorganisms.

The presently disclosed HVAC systems is primarily described herein in connection with automotive vehicles; however, the HVAC systems are not limited thereto and advantageously may be used in a wide variety of different applications. For example, the presently disclosed HVAC systems may be used in other types of vehicles, e.g., land, marine, and/or aeronautical vehicles, as well as in commercial or residential building applications.

Figure 1:
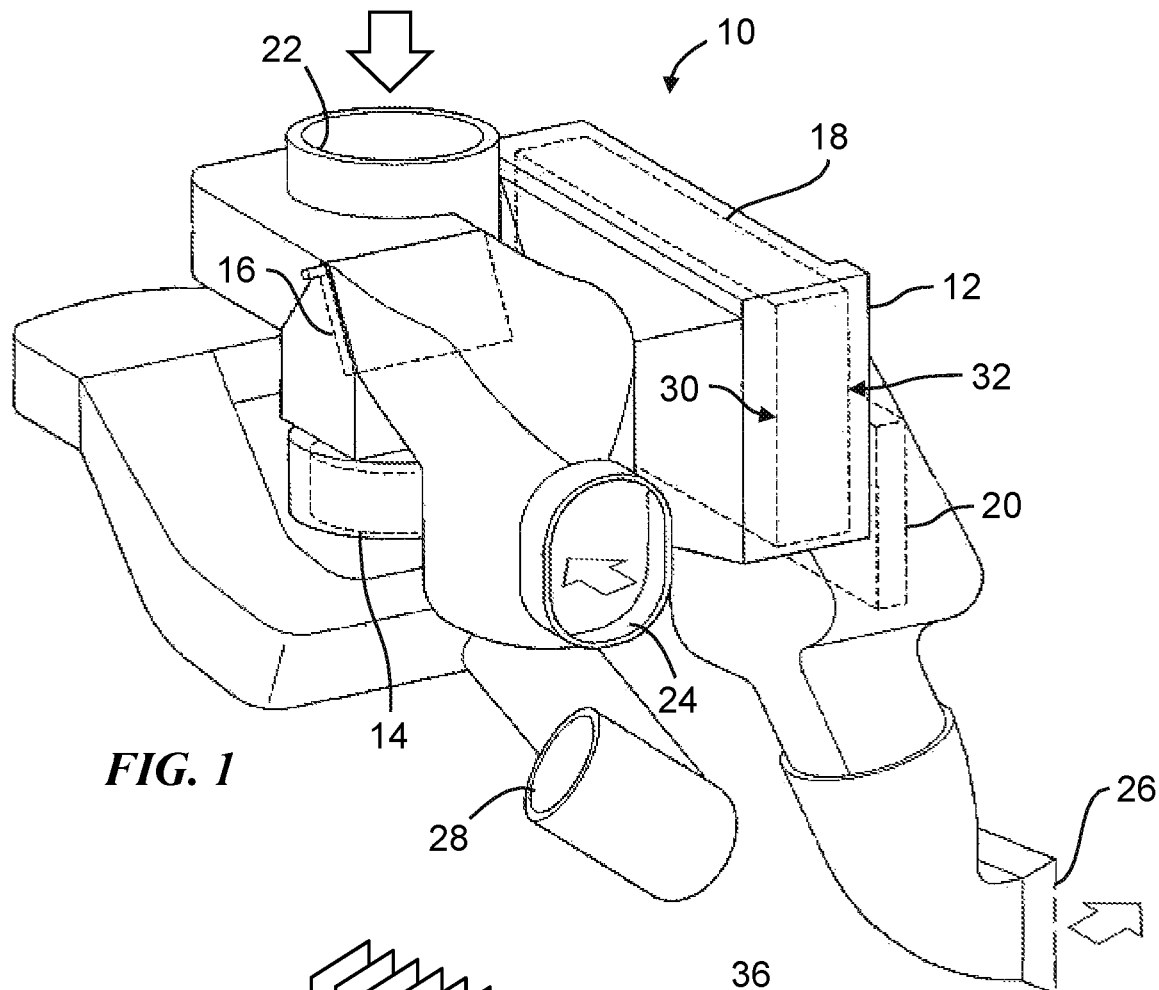
FIG. 1 is a schematic perspective view of a heating, ventilation, and air conditioning (HVAC) system for an automotive vehicle that includes a housing and an evaporator core supported within the housing for cooling and dehumidifying air introduced into and discharged from the housing.

FIG. 1 depicts a heating, ventilation, and air conditioning (HVAC) system 10 for an automotive vehicle (not shown). The HVAC system 10 includes a housing 12, a blower 14, a damper 16, an evaporator core 18, and a heater core 20. The housing 12 comprises an inside air intake 22, an outside air intake 24, a passenger cabin outlet port 26, and an air discharge port 28. Based upon the position of the damper 16, air is either introduced into the housing 12 via the inside air intake 22 or the outside air intake 24 and is directed through the housing 12 via the blower 14. Air introduced into the housing 12 is directed through the evaporator core 18 and optionally through the heater core 20 prior to being discharged from the housing 12 via the passenger cabin outlet port 26 or the air discharge port 28. In one form, the HVAC system 10 may be modular and may include all necessary components for heating, ventilating, and conditioning air introduced into and contained within a passenger compartment of the automotive vehicle.

Figure 2:
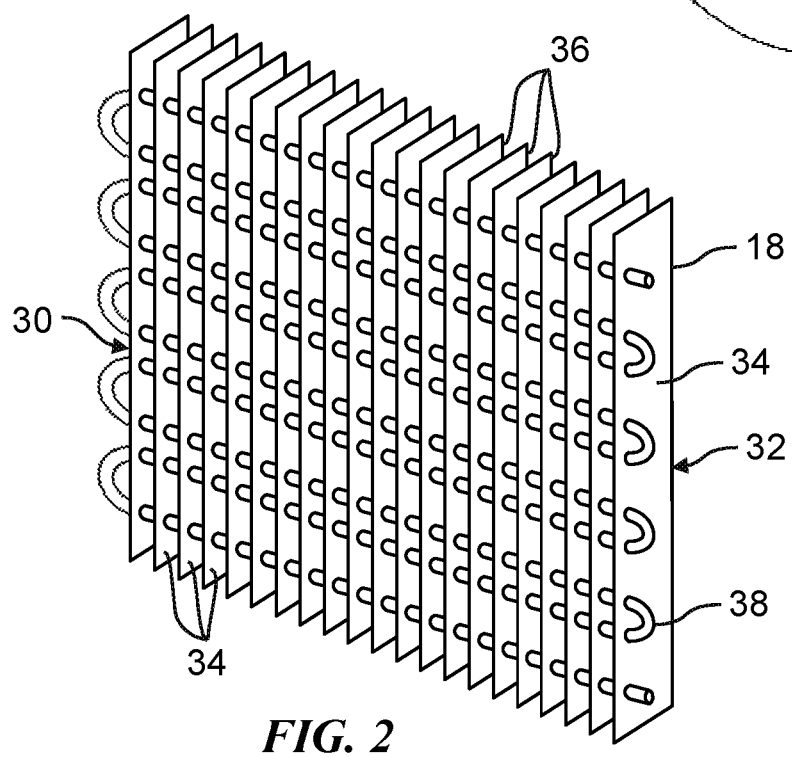
FIG. 2 is a schematic perspective view of the evaporator core of FIG. 1.

Referring now to FIG. 2, the evaporator core 18 is supported within the housing 12 and is configured to cool and dehumidify water vapor-containing air introduced into the housing 12 prior to discharge. The evaporator core 18 includes an upstream inlet face 30 in which air is received, a downstream outlet face 32 from which air is discharged, a plurality of air-contacting surfaces 34 extending between the inlet and outlet faces 30, 32, and one or more conduits 38 through which a refrigerant is circulated. The air-contacting surfaces 34 of the evaporator core 18 are physically coupled to the conduits 38 so that heat exchange can occur via conduction between the refrigerant flowing through the conduits 38 and the air flowing over the air-contacting surfaces 34 of the evaporator core 18. The air-contacting surfaces 34 provide the evaporator core 18 with a relatively high surface area, which allows for a relatively high rate of heat transfer between the air flowing through the evaporator core 18 and the refrigerant flowing through the conduits 38. During air conditioning operation, water vapor-containing air flows over the air-contacting surfaces 34 of the evaporator core 18 and at least some of the water vapor in the air condenses and collects as water droplets on the relatively cool air-contacting surfaces 34 of the evaporator core 18.

As shown in FIG. 2, the air-contacting surfaces 34 of the evaporator core 18 may be defined by an array of metal plates or fins 36. The fins 36 may be made of metal, e.g., an aluminum (Al) alloy having high heat transfer properties. In some embodiments, the fins 36 of the evaporator core 18 may be generally flat, corrugated (wavy), or irregular in physical shape and the conduits 38 may be generally planar, cylindrical, or irregularly-shaped. In one form, the evaporator core 18 may include a plurality of fins separated from one another by parting sheets (not shown). The evaporator core 18 may be in the form of a tube and fin, plate and fin, or plate and frame heat exchanger.

An antimicrobial coating (not shown) may be formed on the air-contacting surfaces 34 of the evaporator core 18. The antimicrobial coating prevents, inactivates, or inhibits growth of microorganisms on the air-contacting surfaces 34 and thereby prevents or reduces the generation of certain undesirable odors within the HVAC system 10 and the introduction of such odors into the passenger cabin of the automotive vehicle. For example, the antimicrobial coating may prevent or reduce the generation of certain chemical compounds within the HVAC system 10 that may be produced as byproducts of microbial growth and metabolism, and thus may prevent or reduce the generation of certain undesirable odors in the HVAC system 10 that tend to be associated with such chemical compounds. In some embodiments, the antimicrobial coating also may be formed on one or more other surfaces within the HVAC system 10, for example, on interior surfaces of the housing 12 and/or on exterior surfaces of the blower 14 and/or damper 16. The antimicrobial coating may have a thickness in the range of one micrometer to 100 micrometers, or, more preferably, in the range of one micrometer to less than 5 micrometers.

The antimicrobial coating comprises an ionic material. The term "ionic material" refers to a material that includes immobilized ionic groups of one type of charge and mobile counterions of another type of charge. The mobile counterions may be ionically associated with the immobilized ionic groups and may be present in an equivalent amount to neutralize the immobilized ionic groups. The ionic groups may be immobilized, for example, by a covalent bond. The overall charge of the ionic material may be neutral. The immobilized ionic groups and/or the mobile counterions of the ionic material may provide the ionic material with antimicrobial activity.

In one form, the antimicrobial coating may comprise an anionic material having one or more anionic groups and/or countercations that exhibit antimicrobial activity. The term "anionic material" refers to a material that includes immobilized negatively charged groups (anionic groups) ionically associated with mobile countercations. In another form, the antimicrobial coating may comprise a cationic material having one or more cationic groups and/or counteranions that exhibit antimicrobial activity. The term "cationic material" refers to a material that includes immobilized positively charged groups (cationic groups) ionically associated with mobile counteranions.

In embodiments where the antimicrobial coating comprises an anionic material, the countercations may comprise one or more metal cations that exhibit antimicrobial activity. Examples of metal cations that exhibit antimicrobial activity include ions of silver ($Ag^+$ and/or $Ag^{2+}$), copper ($Cu^+$ and/or $Cu^{2+}$), zinc ($Zn^{2+}$), and/or vanadium ($V^+$, $V^{3+}$, $V^{4+}$, and/or $V^{5+}$). In embodiments where the antimicrobial coating comprises a cationic material, the cationic groups may comprise one or more functional groups that exhibit antimicrobial activity. Examples of cationic groups that exhibit antimicrobial activity include quaternary ammonium groups ($NR_4^+$) and/or quaternary phosphonium groups ($PH_4^+$), where R is an alkyl group, an aryl group, or a halide. Specific examples of quaternary ammonium groups that exhibit antimicrobial activity include trialkylbenzyl ammonium, trimethylbenzyl ammonium, and dimethyl-2-hydroxyethylbenzyl ammonium.

The ionic material may be intermingled with a polymeric binder to provide the antimicrobial coating with structural integrity and to help the antimicrobial coating adhere to the surface(s) of the HVAC system 10. For example, in one form, the ionic material may be provided in powder form and intermingled with a polymeric binder. In such case, the ionic material particles may have a mean particle diameter in the range of 5 nanometers to 900 nanometers. Examples of suitable polymeric binders include polyurethanes, polyacryls, polymethacryls, thermoplastic polymers of ethylene and propylene, polyesters, polyamides, polyvinyl alcohols, polyvinyl pyrrolidinones, polyolefins, rubbers, vinyl acetate homopolymers and co- or terpolymers, polystyrenic resins, and combinations thereof. The binder may be present in the antimicrobial coating in an amount ranging from about 10 wt. % to about 90 wt. % of the antimicrobial coating.

In one form, the ionic material may comprise an ionomer. The term "ionomer" refers to a polymer composed of repeat units of both electrically neutral groups and ionic groups covalently bonded to its polymer backbone chain as pendant group moieties. In embodiments where the ionic material comprises an ionomer, the ionomer may comprise an organic polymer having one or more anionic or cationic groups covalently bonded to its polymer backbone chain. The anionic or cationic groups may comprise less than 20 mol. %, less than 15 mol. %, or less than 10 mol. % of the organic polymer. The anionic or cationic groups may be neutralized by counterions. The counterions associated with the anionic or cationic groups may comprise less than 50 wt. %, or, more preferably, less than 10 wt. % of the organic polymer. In some embodiments, the organic polymer may comprise a polydiene or a polyvinyl. For example, the organic polymer may comprise a polymer or copolymer of a polyolefin (e.g., a polyethylene, polypropylene, and/or polybutylene), polyester, polyurethane, polystyrene, polyacrylate, polymethacrylate, poly(methyl methacrylate), polyacrylonitrile, polybutadiene, polyisoprene, poly(vinyl acetate), acrylonitrile-butadiene-styrene (ABS) copolymer, styrene-acrylonitrile (SAN) copolymer, styrene-butadiene copolymer, and/or a styrene-ethylene-butylene-styrene (SEBS) copolymer. The ionomer may be formed by the copolymerization of a metal salt and one or more organic monomers, e.g., one or more monomers of ethylene, propylene, styrene, methylpentene, 1-butene, 1-pentene, 1-hexene, isobutylene, diene, butadiene, acrylonitrile, isoprene, acrylic acid, methacrylic acid, and/or tetrafluorethylene.

In one form, the organic polymer may include one or more covalently bound carboxylate (—$COO^-$), sulfonate (—$SO_3^-$), and/or phosphonate (—$PO_3^{2-}$) anionic groups, which may be neutralized by one or more metal cations that exhibit antimicrobial activity (e.g., cations of Ag, Cu, Zn, and/or V). In another form, the organic polymer may include one or more covalently bound quaternary ammonium and/or quaternary phosphonium cationic groups that exhibit antimicrobial activity. In such case, the quaternary ammonium and/or quaternary phosphonium cationic groups may be neutralized by one or more of the following counteranions: bromide ($Br^-$), chloride ($Cl^-$), iodide ($I^-$), bisulfide ($SH^-$), thiocyanate ($SCN^-$), nitrate ($NO_3^-$), and/or acetate ($CH_3COO^-$).

Specific examples of ionomers that may be included in the antimicrobial coating include sulfonated polystyrene, sulfonated tetrafluoroethylene, ethylene acrylic acid copolymer (EAA), and ethylene (meth)acrylic acid copolymer (EMAA).

In another form, the ionic material of the antimicrobial coating may comprise a zeolite material. In embodiments where the antimicrobial coating comprises a zeolite, the zeolite may comprise a natural or synthetic zeolite material including one or more cationic groups exhibiting antimicrobial activity. Zeolites are microporous crystalline aluminosilicate materials comprising a three-dimensional framework of $AlO_2$ and $SiO_2$ tetrahedral units and extra-framework cations. Each $AlO_2$ unit introduces one negative charge to the framework, which is offset by the extra-framework cations. In embodiments where the antimicrobial coating comprises a zeolite, the zeolite material may comprise a three-dimensional framework of $AlO_2$ and $SiO_2$ tetrahedral units and extra-framework cationic species that exhibit antimicrobial activity. In one form, the zeolite material may comprise extra-framework metal cations (e.g., cations of Ag, Cu, Zn, and/or V). In another form, the extra-framework cationic species of the zeolite material may comprise quaternary ammonium cation groups and/or quaternary phosphonium cation groups. The extra-framework metal cationic species may comprise less than 10 wt. % of the zeolite material.

Zeolite materials may be categorized based upon the crystalline structure of their corner-sharing network of tetrahedrally coordinated atoms or T-atoms (e.g., Si and Al). Zeolite structures are typically described or defined by reference to a framework type code consisting of three capital letters and assigned by the International Zeolite Association ("IZA"). A listing of all framework type codes assigned by the IZA can be found in the Atlas of Zeolite Framework Types, Sixth Revised Edition, Elsevier (2007). In one form, the ionic material may comprise an aluminosilicate zeolite material having a high silicon to aluminum ratio. For example, the Si:Al molar ratio of the aluminosilicate zeolite material may be in the range of 15:100, 25:30, or 50:55. The zeolite material may have a surface area of greater than 400 $m^2/g$. In at least some embodiments, the zeolite material may be porous and hydrophilic. In such case, the zeolite material may have a pore size in the range of 0.5 nanometers to 10 nanometers and/or a water contact angle of less than 20 degrees.

The antimicrobial coating may be formed on the air-contacting surfaces 34 of the evaporator core 18 by (and/or on one or more other surfaces within the HVAC system 10) by any suitable method. For example, particles of the ionic material may be mixed with a polymeric binder and optionally an organic solvent to form a precursor solution, suspension, or dispersion, which may be applied to the surfaces 34 by spray coating, dip coating, brushing, or any other suitable method. Thereafter, the precursor may be heated at a temperature in the range of 50° C. to 250° C. or exposed to ultraviolet (UV) light for 0.1-10 minutes to cure the binder and/or remove the solvent from the precursor. Example polymeric binders include epoxide, polyamide-imide, polyether-imide, polyphenole, polyester, phenoxy-phenolic, epoxide-phenolic, acrylic, urethane, and combinations thereof. Example organic solvents include xylene, toluene, N-methyl pyrrolidone, pentane, hexane, methanol, ethanol, isopropanaol, acetonitrile. acetone, methyl ethyl ketone, ethyl acetate, butyl acetate, and combinations thereof.

Referring now to FIGS. 3-6, in some embodiments, microorganism growth may be prevented, inactivated, or inhibited by irradiating the air-contacting surfaces 34 of the evaporator core 18 with ultraviolet (UV) light having wavelengths in the range of 100 nm to 400 nm. In some embodiments, the evaporator core 18 may be irradiated with UV-A and/or UV-B light having wavelengths in the range of 280 nm to 400 nm. In other embodiments, the evaporator core 18 may be irradiated with UV-C light having wavelengths in the range of 100 nm to 280 nm. For example, the evaporator core 18 may be irradiated with UV-C light having wavelengths in the range of 250 nm to 280 nm.

Irradiating the air-contacting surfaces 34 of the evaporator core 18 with UV-C light can effectively and efficiently prevent, inactivate, or inhibit microorganism growth on the air-contacting surfaces 34 of the evaporator core 18. In embodiments where the evaporator core 18 is irradiated with UV-A and/or UV-B light, a titanium oxide ($TiO_2$) coating may be formed on the air-contacting surfaces 34 of the evaporator core 18 so that the exposure to UV-A or UV-B light will trigger antimicrobial activity in the $TiO_2$ coating. In one form, the $TiO_2$ coating may comprise particles of $TiO_2$ intermingled with a polymeric binder. In such case, the particles of $TiO_2$ may be intermingled with one or more of the same polymeric binders as the ionic material. In another form, the titanium oxide ($TiO_2$) coating may be formed on the air-contacting surfaces 34 of the evaporator core 18 using one or more active titanium organometallic compounds, e.g., titanium isopropoxide and/or titanium ethoxide. The one or more active titanium organometallic compounds may be dissolved in a low boiling point solvent, e.g., hexane, to form a titanium oxide precursor solution. Thereafter, the titanium oxide precursor solution may be applied to the air-contacting surfaces 34 of the evaporator core 18 and subsequently dried (e.g., by exposure to ambient air) to evaporate the solvent and form a conformable adherent titanium oxide coating on the air-contacting surfaces 34 of the evaporator core 18.

The air-contacting surfaces 34 of the evaporator core 18 may be exposed to UV light, for example, by direct or indirect exposure from a UV light source, e.g., a semiconductor UV light emitting diode (LED) and/or natural sunlight. For example, the evaporator core 18 may be directly exposed to UV light by permanently or temporarily positioning one or more semiconductor UV-LEDs adjacent the inlet face 30 and/or the outlet face 32 (not shown) of the evaporator core 18 so that the evaporator core 18 is directly exposed to the UV light emitted from the UV-LEDs. As another example, the evaporator core 18 may be indirectly exposed to UV light by directing UV light from a UV light source, through a UV translucent material, and onto the evaporator core 18. Example UV translucent materials that may be used to effectively transfer UV light from a source of UV light to the evaporator core 18 include light pipes, fiber optics, nanofiber optics lens, prisms, mirrors, and combinations thereof. Such UV translucent materials may comprise quartz glass or sapphire, for example.

As shown in FIG. 3, in one form, one or more UV-LEDs 40 may be fixed to a hub 42 and coupled to the inlet face 30 or the outlet face 32 of the evaporator core 18. In such case, the UV-LEDs 40 each may be disposed within a housing that exhibits the shape of an airfoil so that air flowing through the evaporator core 18 (from the inlet face 30 to the outlet face 32, or vice versa) causes the UV-LEDs 40 to rotate in a clockwise or counterclockwise direction, thereby exposing the entire inlet face 30 (or outlet face 32) of the evaporator core 18 to UV light. Additionally or alternatively, the UV-LEDs 40 may be coupled to a motor (not shown), which may rotate the hub 42 and the UV-LEDs 40 in a clockwise or counterclockwise direction to expose the entire inlet face 30 (or outlet face 32) of the evaporator core 18 to UV light.

As shown in FIG. 4, in another form, a first UV-LED 44 may be fixed to a first hub 46 at a first corner of the evaporator core 18 and a second UV-LED 48 may be fixed to a second hub 50 at a second corner of the evaporator core 18. Both the first and second hubs 46, 50 may be coupled to the inlet face 30 or the outlet face 32 of the evaporator core 18. In such case, each of the first and second UV-LEDs 44, 48 may be coupled to a motor (not shown), which may rotate the UV-LEDs 44, 48 back-and-forth in a clockwise or counterclockwise direction to expose the entire inlet face 30 (or outlet face 32) of the evaporator core 18 to UV light.

As shown in FIG. 5, in another form, a first UV-LED 52 may be fixed to a first hub 54 at a first side of the evaporator core 18 and a second UV-LED 56 may be fixed to a second hub 58 at a second side of the evaporator core 18. Both the first and second hubs 54, 58 may be coupled to the inlet face 30 or the outlet face 32 of the evaporator core 18. In such case, each of the first and second UV-LEDs 52, 56 may be coupled to a motor (not shown), which may rotate the UV-LEDs 52, 56 back-and-forth in a clockwise or counterclockwise direction to expose the entire inlet face 30 (or outlet face 32) of the evaporator core 18 to UV light.

As shown in FIG. 6, in yet another form, one or more UV-LEDs 60 may be suspended adjacent to the inlet face 30 or the outlet face 32 of the evaporator core 18, for example, by a pair of first and second hubs 62, 64 disposed on opposite ends of the evaporator core 18. In such case, a motor (not shown) may be used to rotate the hubs 62, 64 back-and-forth so that the UV-LED 60 repeatedly moves towards and away from the inlet face 30 or the outlet face 32 of the evaporator core 18, while also exposing the entire inlet face 30 (or outlet face 32) of the evaporator core 18 to UV light.

The above description of preferred exemplary embodiments, aspects, and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A heating, ventilation, and air conditioning (HVAC) system comprising:
   an air intake;
   an air outlet;
   an evaporator core disposed in fluid communication with the air intake and the air outlet, the evaporator core including an upstream inlet face in which humid air is received, a downstream outlet face from which dehumidified air is discharged, and a plurality of air-contacting surfaces extending between the inlet and outlet faces, the plurality of air-contacting surfaces being made of metal; and an antimicrobial coating formed on the air-contacting surfaces of the evaporator core, the antimicrobial coating comprising an ionic material dispersed in a polymeric binder, the ionic material having immobilized ionic groups and mobile counterions, wherein the mobile counterions are ionically associated with the immobilized ionic groups, wherein the polymeric binder comprises at least one of an epoxide, polyamide-imide, polyether-imide, polyphenole, polyester, phenoxy-phenolic, epoxide-phenolic, or urethane, and wherein the ionic material comprises an anionic material and the mobile counterions comprise cations.

2. The system of claim 1 wherein the mobile counterions comprise cations of at least one of silver, copper, zinc, or vanadium.

3. The system of claim 1 wherein the mobile counterions comprise quaternary ammonium cations or quaternary phosphonium cations.

4. The system of claim 1 wherein the ionic material comprises a zeolite.

5. The system of claim 1 wherein the ionic material comprises an organic polymer having a covalently bound ionic group.

6. The system of claim 5 wherein the organic polymer comprises at least one of a polyolefin, polyester, polyurethane, polystyrene, polyacrylate, polymethacrylate, poly(methyl methacrylate), polyacrylonitrile, polybutadiene, polyisoprene, poly(vinyl acetate), acrylonitrile-butadiene-styrene (ABS) copolymer, styrene-acrylonitrile (SAN) copolymer, or styrene-ethylene-butylene-styrene copolymer.

7. The system of claim 5 wherein the covalently bound ionic group comprises at least one of a carboxylate, sulfonate, or phosphonate group.

8. The system of claim 5 wherein the ionic material comprises an ionomer, and wherein the ionomer is at least one of a sulfonated polystyrene, sulfonated tetrafluoroethylene, ethylene acrylic acid copolymer (EAA), or ethylene (meth)acrylic acid copolymer (EMAA).

9. The system of claim 1 wherein the mobile counterions constitute less than 50 wt. % of the ionic material.

10. The system of claim 1 wherein the air-contacting surfaces of the evaporator core are defined by an array of metal plates or fins, and wherein the metal plates or fins are made of an aluminum (Al) alloy.

11. The system of claim 1 wherein the evaporator core comprises a tube and fin, plate and fin, or plate and frame heat exchanger.

12. The system of claim 1 wherein the air outlet is in fluid communication with a passenger compartment of an automotive vehicle.

13. A heating, ventilation, and air conditioning (HVAC) system for an automotive vehicle, the system comprising:
a housing including an air intake and an air outlet;
an evaporator core supported within the housing and disposed in fluid communication with the air intake and the air outlet thereof, the evaporator core including an upstream inlet face in which humid air is received, a downstream outlet face from which dehumidified air is discharged, and a plurality of air-contacting surfaces extending between the inlet and outlet faces, the plurality of air-contacting surfaces being made of an aluminum (Al) alloy;
and an antimicrobial coating formed on the air-contacting surfaces of the evaporator core, the antimicrobial coating comprising an ionic material dispersed in a polymeric binder, the ionic material having immobilized ionic groups and mobile counterions, wherein the mobile counterions are ionically associated with the immobilized ionic groups,
wherein the polymeric binder comprises at least one of an epoxide, polyamide-imide, polyether-imide, polyphenole, polyester, phenoxy-phenolic, epoxide-phenolic, or urethane, and
wherein the ionic material comprises an anionic material and the mobile counterions comprise cations.

14. The system of claim 13 wherein the ionic material comprises an ionomer or a zeolite material.

15. The system of claim 13 wherein the mobile counterions comprise cations of at least one of silver, copper, zinc, vanadium, quaternary ammonium, or quaternary phosphonium.

16. The system of claim 13 wherein the air-contacting surfaces of the evaporator core are defined by an array of metal plates or fins, and wherein the metal plates or fins comprise an aluminum (Al) alloy.

17. The system of claim 1 wherein the ionic material comprises an anionic material, and wherein the mobile counterions comprise cations of vanadium.

* * * * *